Nov. 1, 1949          R. MORRISSON          2,486,967

AIRPLANE WING WITH JET PROPULSION APPARATUS

Filed July 25, 1945          2 Sheets-Sheet 1

INVENTOR.
REEVES MORRISSON
BY
Ernest D. Given
ATTORNEY

Nov. 1, 1949     R. MORRISSON     2,486,967
AIRPLANE WING WITH JET PROPULSION APPARATUS
Filed July 25, 1945     2 Sheets-Sheet 2

INVENTOR.
REEVES MORRISSON
BY
*Ernest D. Given*
ATTORNEY

Patented Nov. 1, 1949

2,486,967

UNITED STATES PATENT OFFICE 2,486,967

AIRPLANE WING WITH JET PROPULSION APPARATUS

Reeves Morrisson, Glastonbury, Conn., assignor to United Aircraft Corporation, East Hartford, Conn., a corporation of Delaware Application July 25, 1945, Serial No. 606,934

1 Claim. (Cl. 244—15)

This invention relates to jet propulsion systems using combustion at substantially constant volume.

An object of this invention is to provide improvements in jet propulsion systems for aircraft, particularly for fixed wing aircraft.

Another object is to provide an improved jet propulsion system utilizing the augmenter principle in combination with intermittent jet discharge.

A further object is to provide improvements in the application of jet propulsion systems to aircraft for more efficiently utilizing the fuel energy available in propelling and sustaining the aircraft.

A further object is to provide improvements in scavenging means for jet propulsion combustion chambers.

Other objects and advantages will be apparent from the specification and claim, and from the accompanying drawings which illustrate what are now considered to be preferred embodiments of the invention.

In the drawings, Fig. 1 is a schematic side view, partly in section, of a fixed wing aircraft having incorporated in the wing thereof a jet propulsion apparatus constructed according to this invention.

Fig. 5 is a view showing a modified form of combustion chamber.

Figure 1:
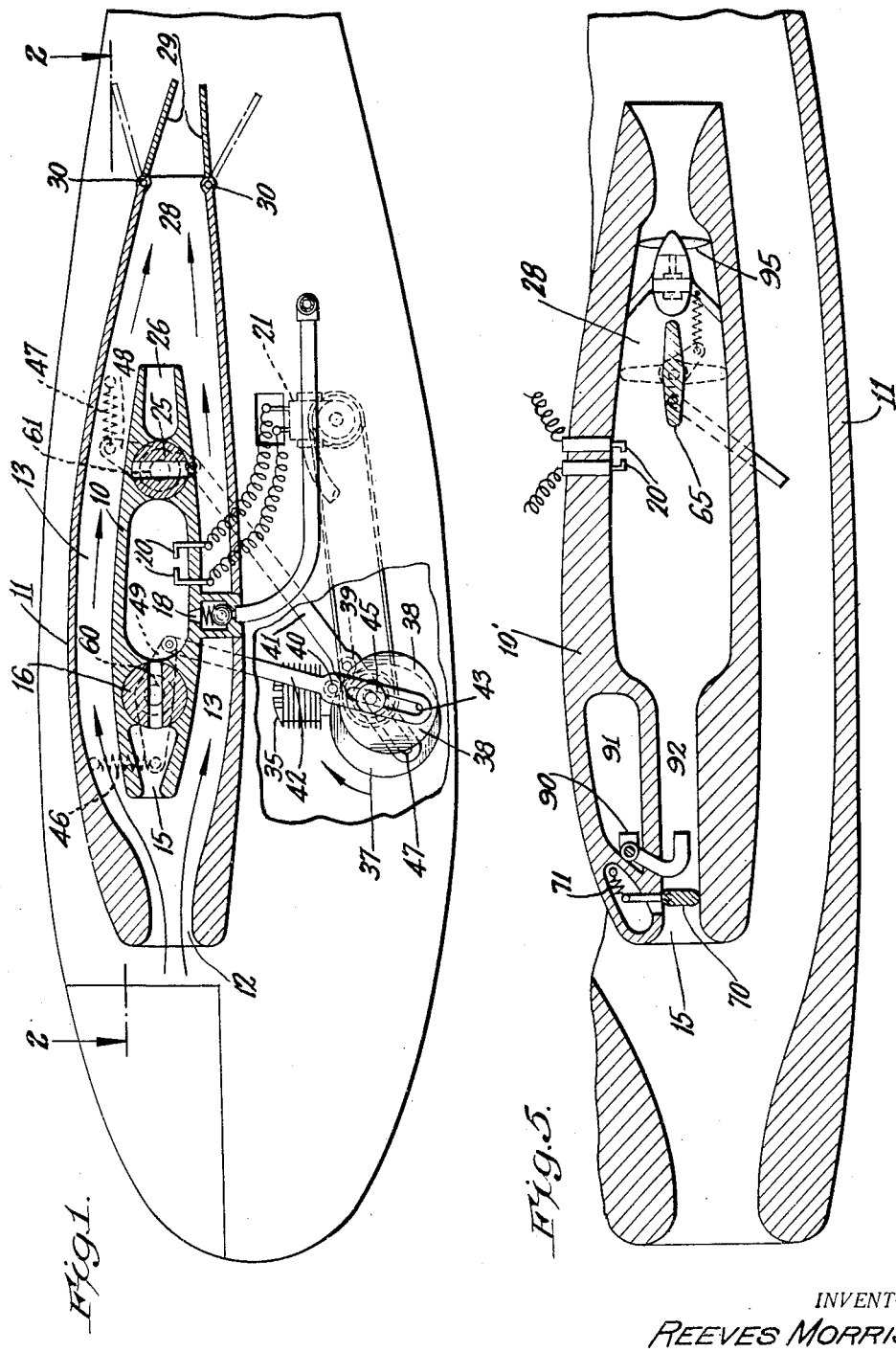
Figure 2:
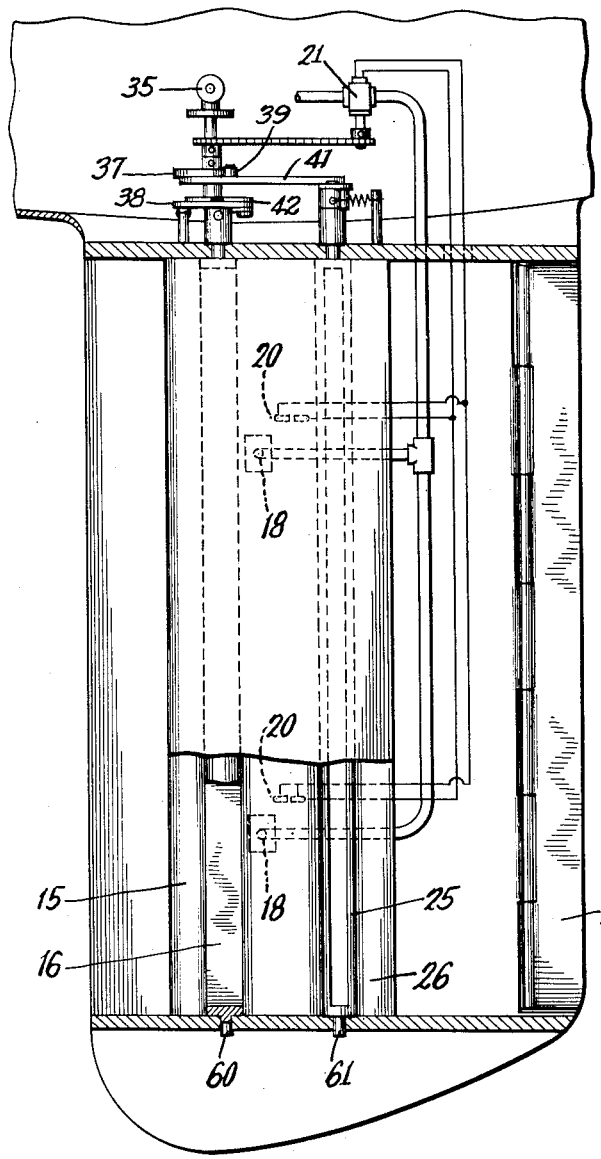
Fig. 2 is a top view, partly in section, of the aircraft and propulsion apparatus of Fig. 1.

Referring to the drawings, Fig. 1 shows a combustion chamber 10 fitted with inlet and outlet valves 16 and 25, fuel nozzle 18, ignition device 20 and a fuel injection pump and magneto unit 21, which cooperate as hereinafter described to produce an intermittent explosive discharge out of nozzle 26. The chamber 10, which has an outer contour of airfoil shape, is mounted in a space 13 within the hollow wing 11. Air is taken into this hollow wing through slot 12 by reason of the forward motion of the airplane. Part of this air is fed to the combustion chamber through duct 15 and valve 16, the remainder passes through space 13 around both sides of the combustion chamber and mixes with the jet exhaust issuing from valve 25 and nozzle 26 into passage 28. The nozzle 26 and passage 28 together constitute an ejector pump which performs the following functions. The discharge from the nozzle 26 mixes with and accelerates the air flow from space 13. The mixture is discharged through a controllable area nozzle 29 at the rear of wing 11 as a jet of greater mass and greater propulsive effect than the primary discharge through nozzle 26. This augmenter principle is well known in the jet propulsion field as applied to continuous jet discharges. It is of greater importance applied to intermittent jet discharge, as greater propulsive gains are possible and the resulting discharge does not pulsate so violently, but is smoothed out by the inertia of the induced air flow. A further advantage lies in the pumping action of the ejector which maintains a continuous flow of cooling air over the combustion chamber.

Valves 16 and 25 and the magneto and fuel injection pump unit 21 are driven in timed relationship to each other at a predetermined speed by an engine or motor 35, the speed of which may be controlled in a known manner to select the speed of valve operation. Inlet valve 16 and exhaust valve 26 are rotatably mounted in chamber 10 on pivots, such as shown at 60 and 61 respectively. Both valves are biased in one direction by springs 46 and 47 respectively and are positively rotated against the force of these springs by motor 35 through some known valve operating mechanism, in this instance shown schematically as eccentrics 37 and 38, eccentric followers 39 and 40, and link mechanisms 41 and 42 respectively for the valves 25 and 16. Guides for the links 41 and 42 respectively are provided by pins as shown at 45 and slots 43 and 47. Pins 45 are concentric with the axis of rotation of the eccentrics 37 and 38.

In operation, air will be forced into slot 12, because of the forward motion of the aircraft and because of the ejector effect of nozzle 26, and will flow continuously over chamber 10, where it is energized and expanded somewhat by heat transferred from the combustion chamber, and out the exit nozzle 29. Nozzle defined by controlling members 29 may be adjusted on pivots 30 to control the flow therethrough. Valve 16 is rapidly opened at predetermined intervals by motor 35 and the valve operating mechanism, which is so arranged that exhaust valve 25 is closed when inlet valve 16 is open, and vice versa.

Air entering port 15, when valve 16 is open, is compressed in the combustion chamber by its kinetic energy. Valve 16 then closes, valve 25 also remaining closed, and a meter quantity of fuel, such as gasoline or fuel oil, is injected into the combustion chamber by a pump in the apparatus 21. The magneto portion of the apparatus 21 then energizes the spark gap 20 to fire the fuel-air mixture and the charge burns at constant volume while the inlet and exhaust valves remain closed, resulting in a very great increase in the gas pressure within the combustion chamber. Just before or at about the time combustion is completed, valve 25 is opened for a short interval by the valve operating mechanism and the products of combustion are expelled as a high velocity jet out nozzle 26, mixing with and entraining the air flowing over the outside of chamber 10. Valve 25 is then closed and valve 16 opens, admitting a fresh supply of air to the combustion chamber, the process being repeated as described above at a frequency determined by the speed setting of motor 35. If desired, the valve timing may be arranged so that the inlet valve 16 opens just before the exhaust valve 25 closes, permitting a small amount of fresh air to pass through and scavenge the combustion chamber after every cycle is completed.

Figure 3:
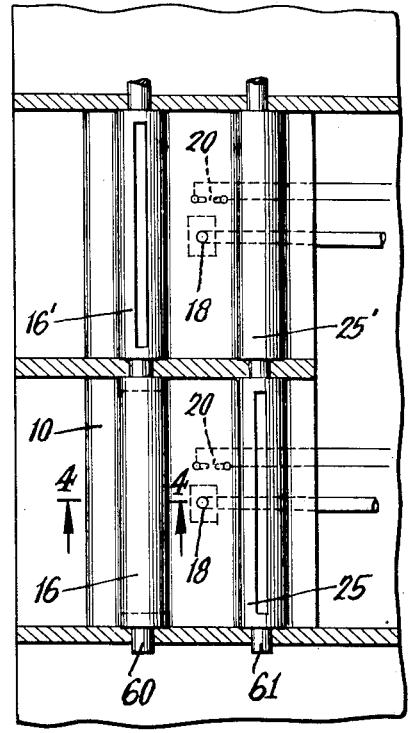
Fig. 3 is a schematic partial view showing a modification of the propulsion apparatus of Figs. 1 and 2.
Figure 4:
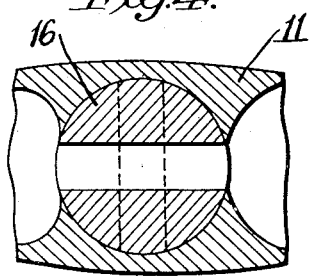
Fig. 4 is a section along the line 4—4 of Fig. 3.

Fig. 1 shows one combustion chamber 10 within hollow wing 11. Best results will be obtained if a plurality of such chambers are mounted within the wing (or nacelle) as shown in Fig. 3. According to this form of the invention, the combustion chamber is divided into a plurality of separate sections spanwise of the wing, each section being provided with individual ignition and fuel supply means separately driven from motor 35. Inlet valves 16, 16', and exhaust valves 25, 25' are each mounted on common shafts and are operated in the manner shown in Fig. 1. The two inlet valves have their ports displaced angularly with respect to each other, as shown in Fig. 4, and the exhaust valves are similarly displaced, so that the two combustion chambers fire at equal intervals, providing substantially constant thrust.

Only the left half of the aircraft wing is shown in Figs. 1 and 3 but it is to be understood that the right half of the wing is similarly provided with a jet propulsion unit. In Fig. 1, the valving and firing mechanisms of the right and left propulsion units are preferably interconnected or timed so that the two units fire simultaneously. In Fig. 3, corresponding right and left units (there being four units in all) are fired simultaneously.

The limiting frequency of discharge of the intermittent flow combustion chamber is dependent on the method of scavenging the products of combustion and introducing the new charge. Fig. 5 shows improved scavenging means. In this figure a combustion chamber 10' is fitted with inlet and exhaust valves 70 and 65 of the pivoted gate and butterfly type, respectively. The modified combustion chamber 10' is disposed within the wing 11 replacing chamber 10.

Exhaust valve 65 is operated mechanically by a valve operating mechanism as shown in Fig. 1, at a predetermined timing. Inlet valve 70 is automatically operated by fluid pressure. Dynamic pressure of the air entering opening 15 opens valve 70 against the force of spring 71 and admits air to the combustion chamber. The exhaust valve 65 is then closed by the valve operating mechanism, resulting in an increase in air pressure in the combustion chamber as a result of the dynamic pressure of the entering air. A fuel valve (not shown and the ignition device 20 are operated by mechanism interconnected with the mechanism that operates valve 65, in a manner like that shown in Fig. 1, so that fuel is admitted through nozzle 90 at a predetermined time in relation to the closing of valve 65 from a high pressure source 91 and is discharged at high velocity down the ejector passage 92 thereby accelerating the flow of charge air. More rapid scavenging and higher charge pressure are obtained by this means. The charge is then fired by an ignition device as a spark gap 20. Valve 70 closes as soon as the pressure within the combustion chamber plus the force of spring 71 exceeds the dynamic pressure of the entering air and combustion occurs at constant volume. Valve 65 is then opened and the pressure in the combustion chamber drops until valve 70 again opens to scavenge and then recharge the chamber with fresh air.

The discharge end of the combustion chamber in Fig. 5 is fitted with a freely rotating bladed wheel or rotor 95. The action of this wheel or rotor is as follows: The initial discharge of gases from the combustion chamber when valve 65 opens strikes the blades of the rotor and drives it like a turbine accelerating it to high velocity. As the discharge continues and the pressure in the combustion chamber falls, the exhaust velocity will decrease until the rotor 95 instead of being driven by the gases is propelling them due to its residual momentum, thus reducing the time required for complete discharge and scavenging of the chamber. Thus, rotor 95 acts as a fly wheel which may rotate continuously, acting alternately as a turbine and as a fan as the products of combustion are intermittently discharged. Preferably, a plurality of rotors 95 are provided, spaced spanwise along a single exhaust slot 28. Or, if desired, slot 28 may be divided into a plurality of separate nozzles, each having a rotor associated therewith.

It is to be understood that the invention is not limited to the specific embodiments herein illustrated and described, but may be used in other ways without departure from its spirit as defined by the following claim.

I claim:

In an aircraft, a wing having a spanwise extending concavity therein which is open as spanwise extending slots in the leading and trailing edges of the wing, a reaction jet engine in said concavity, said engine extending substantially coextensively spanwise with said concavity and being spaced inwardly from the leading and trailing edges of said wing, said engine being spaced vertically from the portions of the wing defining said concavity to provide air passages in said wing respectively above and below said engine, said engine having an intake slot at its forward end and an exhaust slot at its rear end with both said intake and exhaust slots extending substantially coextensively with said first named slots, whereby when said engine is in operation and the aircraft is in forward flight, air flows into the first named slot at the leading edge of the wing, divides so that a part of the air flows into said intake slot of said engine and other parts flow above and below said engine, and exhaust gases passing as a flat sheet out of said exhaust slot serve to induce air flow between said engine and said wing and to force all said exhaust gases and induced air out through the slot aforesaid in the trailing edge of said wing.

REEVES MORRISSON.

(References on following page)

REFERENCES CITED

The following references are of record in the file of this patent:

UNITED STATES PATENTS

| Number | Name | Date |
|---|---|---|
| 949,758 | Duryea | Feb. 22, 1910 |
| 1,043,254 | Russell | Nov. 5, 1912 |
| 1,069,694 | Hayot | Aug. 12, 1913 |
| 1,130,090 | Kutschinski | Mar. 2, 1915 |
| 1,405,482 | Bostedo | Feb. 7, 1922 |
| 1,725,914 | Hallowell | Aug. 27, 1929 |
| 1,980,266 | Goddard | Nov. 13, 1934 |
| 2,348,253 | Griswold | May 9, 1944 |
| 2,404,954 | Godsey | July 30, 1946 |

FOREIGN PATENTS

| Number | Country | Date |
|---|---|---|
| 5,563 | France | Feb. 24, 1906 |
| | (Addition to No. 358,188) | |
| 17,520 | Great Britain | Sept. 2, 1901 |
| 119,469 | Great Britain | May 6, 1920 |
| 504,539 | Great Britain | Apr. 26, 1939 |
| 544,834 | Germany | Feb. 29, 1932 |
| 554,425 | Great Britain | July 2, 1943 |
| 641,739 | France | Apr. 23, 1928 |
| 666,875 | Germany | Oct. 29, 1938 |
| 804,284 | France | July 27, 1936 |
| 844,442 | France | Apr. 24, 1939 |